United States Patent [19]

Lord

[11] Patent Number: 5,590,859
[45] Date of Patent: Jan. 7, 1997

[54] RATCHETING PIPE HANGER ASSEMBLY

[76] Inventor: Paul J. Lord, 72 Hillcrest Ave., Wethersfield, Conn. 06109

[21] Appl. No.: 376,814

[22] Filed: Jan. 23, 1995

[51] Int. Cl.$^6$ ................................................. F16L 3/00
[52] U.S. Cl. .................... 248/62; 248/59; 248/74.2; 248/218.4; 248/296.1
[58] Field of Search ................ 248/62, 59, 58, 248/74.2, 218.4, 229.16, 229.26, 230.1, 230.67, 296, 296.1

[56] References Cited

U.S. PATENT DOCUMENTS

| | | |
|---|---|---|
| 981,769 | 1/1911 | Kinowski . |
| 2,291,148 | 7/1942 | Carson . |
| 2,641,428 | 6/1953 | Kirk et al. ............................ 248/55 |
| 2,681,197 | 6/1954 | Johnson ............................... 248/71 |
| 3,032,305 | 5/1962 | Mittenzwei .......................... 248/62 |
| 3,266,761 | 8/1966 | Walton et al. ....................... 248/71 |
| 3,605,200 | 9/1971 | Vallinotto et al. . |
| 3,913,187 | 10/1975 | Okuda ................................. 24/255 |
| 3,925,851 | 12/1975 | Bevans ............................. 24/20 TT |
| 4,015,809 | 4/1977 | Buril ............................. 248/218.4 X |
| 4,036,460 | 7/1977 | Storck et al. ....................... 248/59 |
| 4,128,918 | 12/1978 | Wenk ................................. 24/16 R |
| 4,153,228 | 5/1979 | Delserro et al. ................... 248/74 |
| 4,183,120 | 1/1980 | Thorne ............................. 24/16 R |
| 4,195,807 | 4/1980 | Llaugé ............................. 248/74.2 |
| 4,247,225 | 1/1981 | Chickini, Jr. et al. ............ 405/260 |
| 4,260,123 | 4/1981 | Ismert ............................... 248/74.1 |
| 4,291,855 | 9/1981 | Schenkel et al. ................ 248/74.1 |
| 4,309,120 | 1/1982 | Werthmann ......................... 403/18 |
| 4,352,478 | 10/1982 | Loew ............................... 248/221.3 |
| 4,372,011 | 2/1983 | Aranyos .......................... 24/20 TT |
| 4,386,752 | 6/1983 | Pavlak et al. ..................... 248/73 |
| 4,478,381 | 10/1984 | Pittion et al. ...................... 248/71 |
| 4,502,186 | 3/1985 | Clarke et al. .................... 24/16 PB |
| 4,550,451 | 11/1985 | Hubbard ............................ 4/192 |
| 4,794,229 | 12/1988 | Goss et al. ....................... 219/548 |
| 4,802,646 | 2/1989 | Cattani ........................... 248/316.5 |
| 4,824,057 | 4/1989 | Suprono ............................ 248/62 |
| 4,840,345 | 6/1989 | Neil et al. ....................... 248/74.2 |
| 4,881,301 | 11/1989 | Sweeney et al. ................. 24/30.5 |
| 4,925,136 | 5/1990 | Knott ................................. 248/62 |
| 4,941,630 | 7/1990 | Albano .............................. 248/71 |
| 5,005,789 | 4/1991 | Jones ................................ 248/58 |
| 5,024,405 | 6/1991 | McGuire ........................... 248/73 |
| 5,199,675 | 4/1993 | DeGuchi ........................... 248/62 |
| 5,221,064 | 6/1993 | Hodges ......................... 248/62 X |
| 5,303,885 | 4/1994 | Wade ............................ 248/62 X |
| 5,423,501 | 6/1995 | Yo ................................ 248/62 X |

FOREIGN PATENT DOCUMENTS

| | | | |
|---|---|---|---|
| 518462 | 11/1955 | Canada ............................... 248/62 |
| 8101040 | 4/1981 | WIPO ................................ 248/62 |

*Primary Examiner*—Alvin C. Chin-Shue
*Assistant Examiner*—Brian J. Hamilla
*Attorney, Agent, or Firm*—Fishman, Dionne & Cantor

[57] ABSTRACT

A hanger assembly for managing pipes, cables, etc. is described having the capability to swivel, easily adjust height and with respect to pipes, reduce noise/vibration associated therewith by containing the pipe suspended thereby in a ratcheting holder. The hanger assembly employs a single hanger pin so that the swiveling capability is provided. The invention further, simplifies the installation of a pipe, in particular, and also of other conduits in need of management/suspension since the hanger can be affixed to a joist, rafter or stud at an estimated location. The assembly can then be adjusted to favorably engage the conduit to be hung or managed.

27 Claims, 4 Drawing Sheets

RATCHETING PIPE HANGER ASSEMBLY

BACKGROUND OF THE INVENTION

1. Field of the Invention

The invention relates to the field of plumbing and similar fields where hangers for pipes, cables, etc. are routinely utilized. More particularly, the invention relates to a new and improved hanger assembly for use in any field where such aparati are employed. Since the invention is equally suited to any type of management/suspension of conduits, this specification will employ pipe hangers as illustrative of the invention. It will be understood, however, that other things may be secured thereby.

2. Prior Art

Pipe hanger assemblies have been made, used and sold for many years, and during that time frame, many varied constructions have been attempted and adopted by the tradesmen who use them.

Generally speaking, there are three main issues of concern in hanging pipes or the like; these are: proximity of the pipe to the supporting structure, ease of engaging the pipe with the hanger and pipe vibration noise.

Referring first to the proximity of the pipe to the supporting structure, U.S. Pat. No. 4,941,630 to Albano; U.S. Pat. No. 3,266,761 to Walton et al; U.S. Pat. No. 2,291,148 to Carson; and U.S. Pat. No. 2,681,197 to Johnson, all provide for differing distances of the subject pipe from the support structure in the same way, i.e., by allowing the installer to hammer affixing nails into the supporting structure at varying distances from the edge of the supporting structure. These all suffer from the drawback however of requiring the installer to position the pipe in the hanger first and then nail the hanger in at whatever position the nails are in. Subsequent to such attachment, adjustability is not possible without removing the entire pipe hanger assembly from the supporting structure and re-nailing it in after height adjustment has been made. This is time consuming, inefficient and irritating to the installer.

Ease of engagement of the pipe and pipe noise are closely related in the prior art and therefore are discussed together. When a pipe is loosely engaged in a pipe hanger, vibrations in the pipe caused by pressure variation and temperature differentials create vexatious noise which generally is amplified and can be heard throughout the structure in which the pipe is housed. However, in the prior art, the more loosely the pipe is engaged, the more quickly and easily the job of installation can be accomplished. This is advantageous to the installer, but is not so for the user of the premises, who must bear the noise created by such installations. Kirk et al, U.S. Pat. No. 2,641,428 discloses an apparatus which endeavors to reduce noise by providing elastomeric discs on which the pipe may reside, however shifts, such as setting of the structure, often defeat the insulating quality of the arrangement by moving the pipe into contact with the noise transmissive parts of the hanger assembly. Other arrangements, found in U.S. Pat. Nos: 2,681,197; 4,941,630; 3,266,761; 2,291,148 have employed belts and elastomeric ring structures. Some of these retain the pipe more tightly than others and some provide better damping of vibrations, however all of them require prepositioning of the pipe within the holders before nailing of the two nail system into the support. Subsequent adjustability is not provided.

Two patents known to the inventor hereof, utilize a single pin or nail for attachment to the support structure with a view to subsequently engaging the pipe with the hanger. These also provide tightly fitting engagement with the pipe to help dampen vibrations. These do not however provide for any adjustability of distance between the pipe and support either before or after installation. Therefore it can be concluded that where the pipe would naturally be further away from the support than the particular hanger, either the pipe would be bent or the hanger could not be utilized. This is a significant drawback since it requires that the installer carry a plurality of different pipe hangers or that the installer bend the pipe to fit; a situation clearly not preferred. It is further noted that with all of the above described devices, engagement of the pipe can be difficult. Traditionally, the tighter the engagement arrangement, the more difficult it is to complete.

More recently, with the introduction of ratcheting clamps, tight engagement of pipes has become a much more simple operation, not to mention more reliable as well. U.S. Pat. Nos. 3,913,187; 3,925,851; 4,183,120; 4,840,345 and 5,024,405 all disclose ratcheting clamps for a variety of applications, including clamping pipes. The ratcheting clamps are easily snapped around an object to be retained in some way and then are pressed so that oppositely facing teeth on either engagement member will engage one another. U.S. Pat. No. 5,024,405 teaches one to employ a ratcheting clamp in conjunction with an engagement plate on a horizontally disposed support member which is itself supported between two adjacent studs. The support member includes holes into which the engagement plate interconnects for lateral adjustability. A significant drawback of the system is that in order to adjust the lateral position of a pipe so engaged requires the complete disassembly of the system.

A further drawback of all of the describe systems is that none provide for swivelability. This can make some installations difficult, which, of course, translates to costly.

SUMMARY OF THE INVENTION

The above-discussed and other drawbacks and deficiencies of the prior art are overcome or alleviated by the hanger assembly of the present invention.

The arrangement of the present invention provides the advantages of adjustability subsequent to installation, ease of engagement, noise reduction, for pipe hanging, and swivelability all in a very cost effective package which is extremely easy to use. Another advantage of the hanger assembly of the invention is that it obviates the need for installers to carry alternate types of pipe hangers.

The hanger of the invention utilizes a single pin upon which a ratcheting clamp is slidingly mounted. The hanger allows an installer to estimate pipe proximity to the support member and pre-install the hanger. Bending of the pipe will not be required because the ratchet clamp is moveable up and down on the single pin. Moreover, it is not necessary to pre-engage the pipe with the clamp as this is easily accomplished after installation of the hanger. Furthermore, since the ratcheting clamp both provides a very tight grip on the pipe and includes the property of damping vibration (since it is composed of an elastomer) the noise factor can be significantly reduced.

The above-discussed and other features and advantages of the present invention will be appreciated and understood by those skilled in the an from the following detailed description and drawings.

BRIEF DESCRIPTION OF THE DRAWINGS

Referring now to the drawings wherein like elements are numbered alike in the several Figures.

DETAILED DESCRIPTION OF THE PREFERRED EMBODIMENTS

Figure 3:
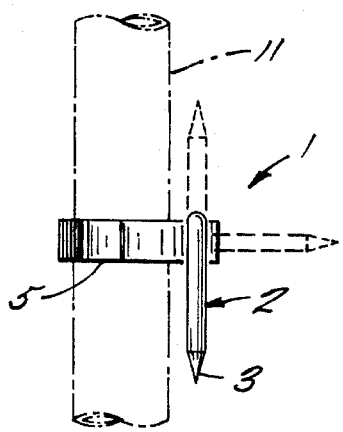
FIG. 3 is a top view of the invention with phantom lines, showing swivelability of the pin of the invention.

In the most preferred embodiment, the invention comprises a pin 1 which is preferably bent at an angle in the range of about 60° to about 120° and which is most preferably about 90°. The pin 1 is normally in the range of about six to ten inches in length, however, it will be understood that any length pin can be employed for differing applications. Pin 1 is preferably constructed of metal or plastic. Bent section 2 is preferably about 1.5 inches in length and includes a sharpened tip 3. As stated with regard to the overall length of the pin 1, the length of bent section 2 can be any length desired without departing from the spirit and scope of the invention. The pin 1 having two ends, one being the sharpened tip 3, also includes, preferably a retainer end 4. Retainer end 4 is simply to prevent the ratchet clamp 5 from sliding off the end of pin 1. Ratchet clamp 5 will be discussed hereunder.

Referring to FIGS. 4–9, retainer end 4 can be in the form of a peened end, shown as 41; a swage fitting 14, a bend 16, a loop 18, an enlarged end 20, a planar winged end 22, etc. with the only important criteria being that it prevents the escape of ratchet clamp 5.

Figure 1:
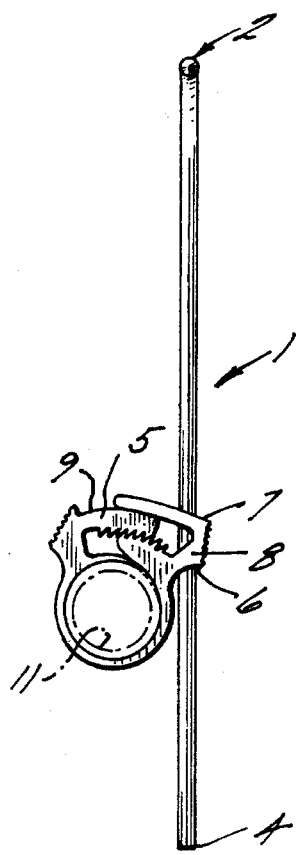
FIG. 1 is aside elevational view of the invention.
Figure 2:
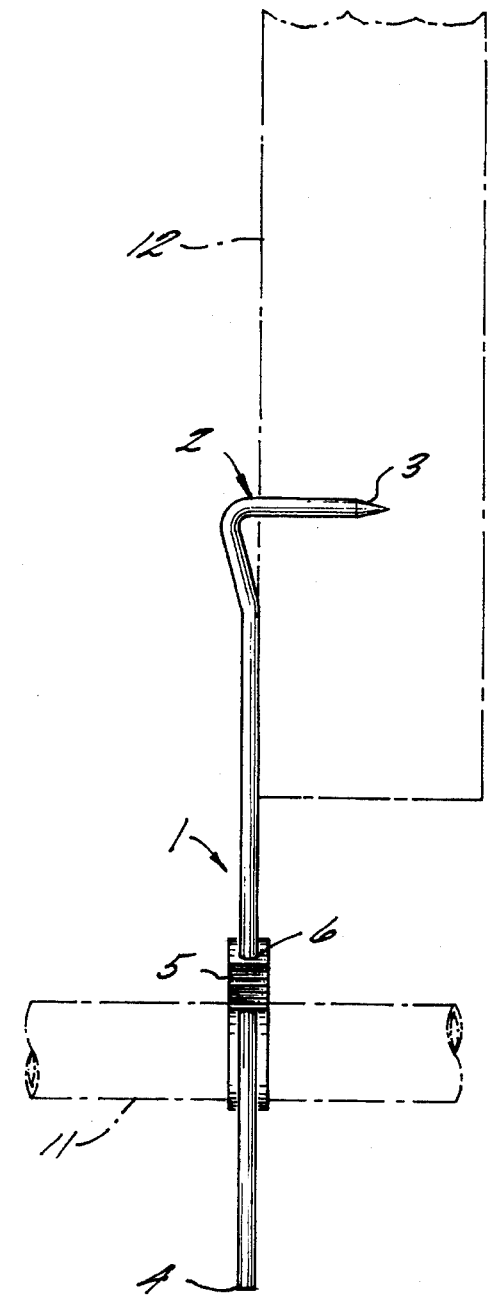
FIG. 2 is another side view with an orientation 90° to FIG. 1.
Figure 4:
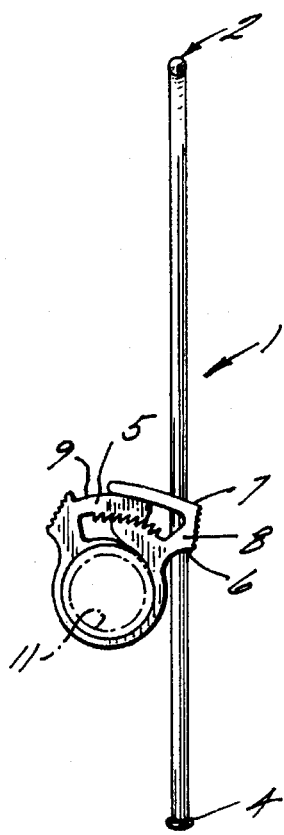
FIG. 4 is an alternative embodiment of FIG. 1 where the pin includes a peened end.
Figure 5:
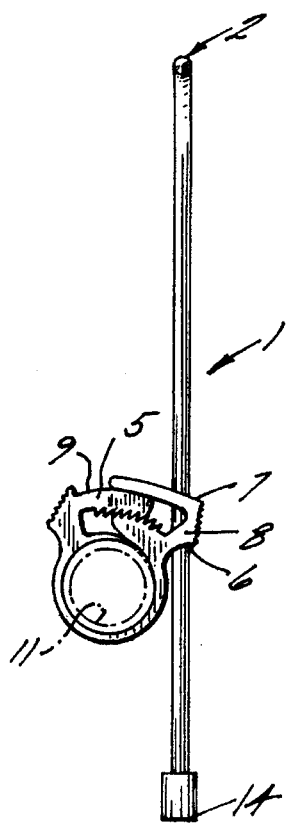
FIG. 5 is an alternative embodiment of FIG. 1 where the pin includes a swage fitting.
Figure 6:
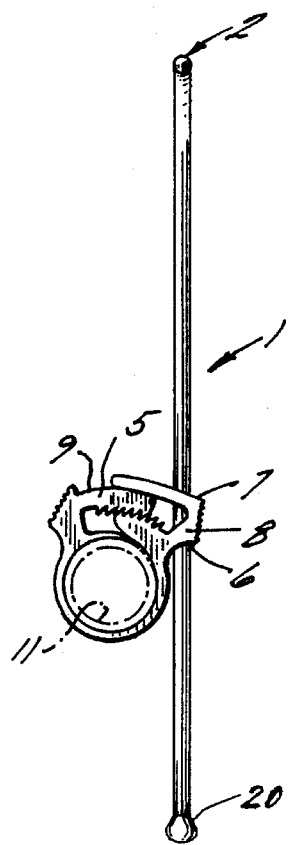
FIG. 6 is an alternative embodiment of FIG. 1 where the pin includes an enlarged end.
Figure 7:
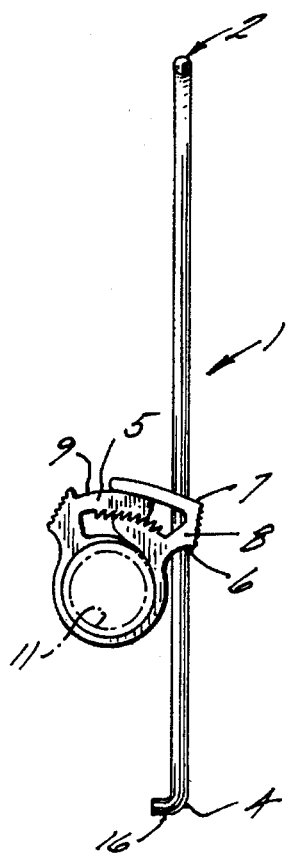
FIG. 7 is an alternative embodiment of FIG. 1 where the pin includes a bent end.
Figure 8:
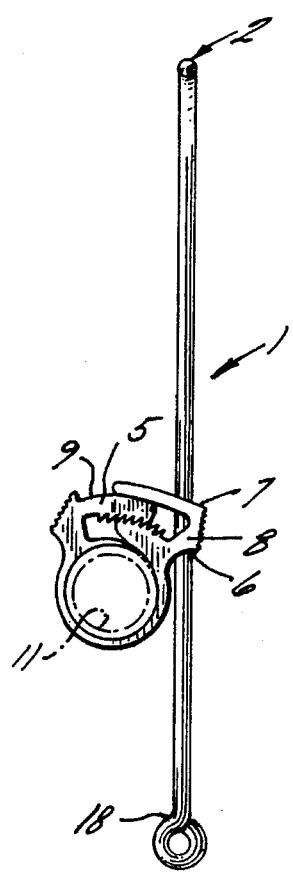
FIG. 8 is an alternative embodiment of FIG. 1 where the pin includes a loop end.
Figure 9:
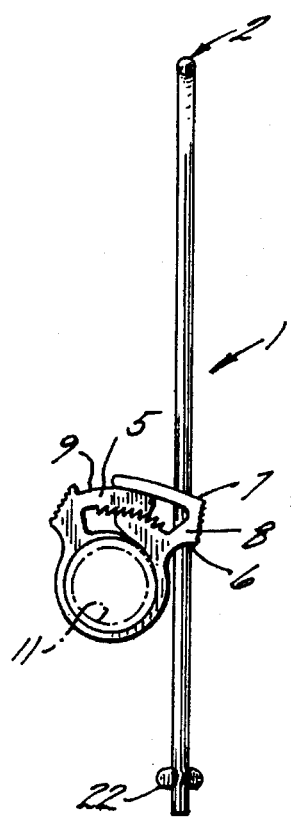
FIG. 9 is an alternative embodiment of FIG. 1 where the pin includes a planar winged end.

Ratchet clamp 5 is fully disclosed in expired U.S. Pat. No. 3,925,851 to Bevans, the entire disclosure of which is incorporated herein by reference. Ratchet clamp 5 is modified from that disclosed in the incorporated, expired patent by creating a bore 6 therein which is sized to accommodate pin 1 by stretching of the material of clamp 5. The material preferably employed is elastomeric and most preferably is plastic or derivative thereof. This allows clamp 5 to be moved along and swiveled relative to pin 1, through the application of force, but retains the clamp in the chosen position in the absence of such sufficient force. As will be appreciated from drawing FIG. 1 the bore 6 extends through one end 7 of clamp 5 and partly through body 8 of clamp 5 to exit at a location more proximal to end 7 than a midpoint between ends 9 and 7. The positioning of bore 6 through clamp 5 allows pin 1 to be inserted therein without being exposed to lumen 10 of clamp 5, thus maintaining the noise reduction potential of the arrangement. The position of bore 6 also provides easy access to clamp 5 for insertion of pipe 11.

The hanger of the invention allows the clamp thereof to swivel 360° to be completely accessible to any direction in which a pipe extends (including along a joist) as well as provides for pipe retention at any distance from the supporting joist or rafter 12 subject only to the length of pin 1.

Figure 10:
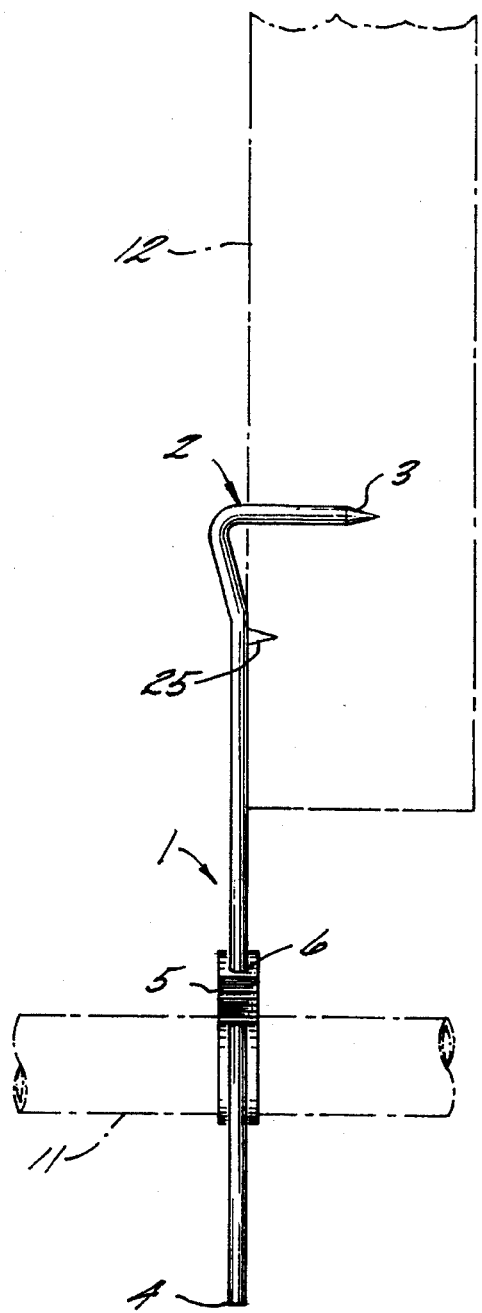
FIG. 10 is an alternative embodiment of the invention wherein a barb is added to the pin.

Referring to FIG. 10, an alternate embodiment of the invention is illustrated wherein a barb 25 is added to pin 1 and extends substantially in the same direction as bent section 2. The barb 25 provides additional stability to the assembly for situations in which additional stability is desireable.

Figure 11:
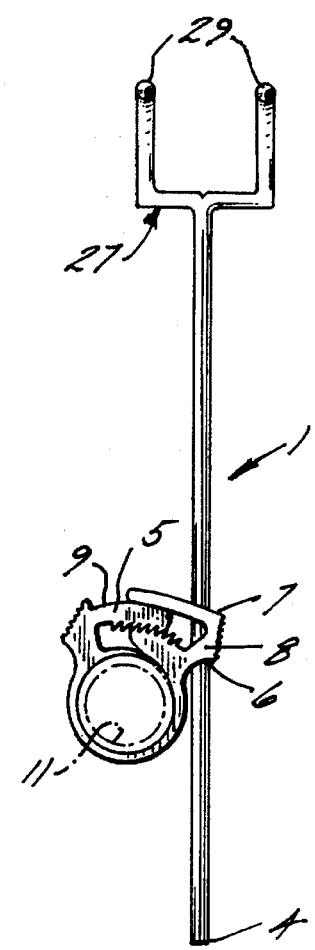
FIG. 11 is another alternative embodiment of the invention wherein the pin is a bifurcated attachment arrangement on one end.

Referring to FIG. 11, another alternative embodiment of the invention is illustrated which essentially replaces bent section 2 with a bifurcated attachment arrangement 27. Bifurcated attachment 27 includes a plurality of, preferably but not necessarily sharpened, piercing projections 29 which are supported by pin 1. As will be understood by those of skill in the art the bifurcated arrangement can be constructed in many ways including but not limited to splitting the pin, providing the arrangement of FIG. 11, molding or casting, etc. two or even more attachment points in some applications; a plurality of attachment points can increase both the utility of the device and increase its holding power.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A pipe hanger assembly comprising:

a single piece pipe receiver having a through bore, said receiver frictionally swivelably and frictionally height adjustably connected to a single one piece pin, said pin passing through said through bore to support said receiver in a desired orientation and position subsequent to said pin being attached to a support structure.

2. A pipe hanger assembly comprising:

a) a single piece pipe receiver for supporting a pipe, said receiver adapted to frictionally attach to a mount, said receiver having a discontinuity in the circumferential extent thereof such that said receiver is capable of snap fitting around said pipe and a through bore disposed on an end of said pipe receiver; and b) a mount slidably attached to the through bore of said receiver such that said mount provides for frictional swiveling and frictional height adjustable support for said receiver subsequent to said mount being affixed to an external support structure.

3. A hanger assembly as claimed in claim 2 wherein said receiver is a ratcheting clamp.

4. A hanger assembly as claimed in claim 2 wherein said mount is an extended fastener having at least one substantially straight section for attachment to said receiver.

5. A hanger assembly as claimed in claim 4 wherein said mount is a pin.

6. A hanger assembly as claimed in claim 5 wherein said pin includes a tip for piercing attachment to said support structure.

7. A hanger assembly as claimed in claim 5 wherein said pin includes a barb for increasing the stability of said pin when installed.

8. A hanger assembly as claimed in claim 5 wherein said pin includes an end adapted to prevent said receiver from becoming unattached to said pin.

9. A hanger assembly as claimed in claim 8 wherein said end is peened.

10. A hanger assembly as claimed in claim 8 wherein said end includes a swage fitting.

11. A hanger assembly as claimed in claim 8 wherein said end is enlarged.

12. A hanger assembly as claimed in claim 8 wherein said end is bent sufficiently to prevent escape of said receiver.

13. A hanger assembly as claimed in claim 8 wherein said end is looped.

14. A hanger assembly as claimed in claim 8 wherein said end is a planar winged end.

15. A hanger assembly as claimed in claim 5 wherein said pin includes a bent section having an angle to said pin of in the range of about 60° to about 120°.

16. A hanger assembly as claimed in claim 15 wherein said angle is about 90°.

17. A hanger assembly as claimed in claim 15 wherein said bent section is about 1.5 inches in length.

18. A hanger assembly as claimed in claim 5 wherein said pin is constructed of metal.

19. A hanger assembly as claimed in claim 5 wherein said pin is constructed of plastic.

20. A hanger assembly as claimed in claim 5 wherein said pin is constructed of plastic coated metal.

21. A hanger assembly as claimed in claim 3 wherein said ratcheting clamp is composed of material comprising an elastomer.

22. A hanger assembly as claimed in claim 21 wherein said elastomer is plastic.

23. A hanger assembly as claimed in claim 3 wherein said clamp includes a band having respective ends including first and second interlocking parts.

24. A hanger assembly as claimed in claim 23 wherein said interlocking parts each include a jaw, said jaw of each part being opposed, said parts further including a tongue spaced from and substantially parallel with each of said jaws to provide with said jaws a pair of cavities into which the opposing jaws may extend, said jaws interlocking by way of a set of triangularly prismoidal teeth on each jaw wherein as viewed in diametrical cross-section the vertex edges of the teeth of one jaw converge from the outer ends of such vertex-edges toward an exterior apical midpoint and the vertex-edges of the teeth of the other jaw converge to an interior apical midpoint, said band having an inner surface with a longitudinal centerline of smaller diameter when tightened on a hose than the outer edges parallel therewith, and having said inner surface of said band in substantially diametrical cross-section of shallow conical configuration with the vertex projecting.

25. A hanger assembly as claimed in claim 5 wherein said pin includes a plurality of tips for attachment to a support structure.

26. A pipe hanger assembly comprising a pipe receiving member having two interlocking parts, said interlocking parts each including a jaw, said jaw of each part being opposed, said parts further including a tongue spaced from and substantially parallel with each of said jaws to provide with said jaws a pair of cavities into which the opposing jaws may extend, said jaws interlocking by way of a set of triangularly prismoidal teeth on each jaw wherein as viewed in diametrical cross-section the vertex edges of the teeth of one jaw converge from the outer ends of such vertex-edges toward an exterior apical midpoint and the vertex-edges of the teeth of the other jaw converge to an interior apical midpoint, said band having an inner surface with a longitudinal centerline of smaller diameter when tightened on a hose than the outer edges parallel therewith, and having said inner surface of said band in substantially diametrical cross-section of shallow conical configuration with the vertex projecting, said pipe receiving member further defining a through bore disposed adjacent one of said cavities, said through bore accepting a mounting pin, said through bore being sized sufficiently to frictionally accept the mounting pin such that said pipe receiving member is frictionally swivelable end frictionally height adjustable on said pin while providing sufficient friction to allow said pin to support said pipe receiving member subsequent to said pin being affixed to a supporting structure.

27. A pipe hanger as claimed in claim 26 wherein said pin is of a predetermined cross sectional dimension and said through bore is of a predetermined cross section dimension sufficiently smaller than said pin dimension to require slight expansion of said through bore to accommodate said pin.

\* \* \* \* \*